No. 65,327.
J. B. ALEXANDER.
GATE.
PATENTED JUNE 4, 1867.
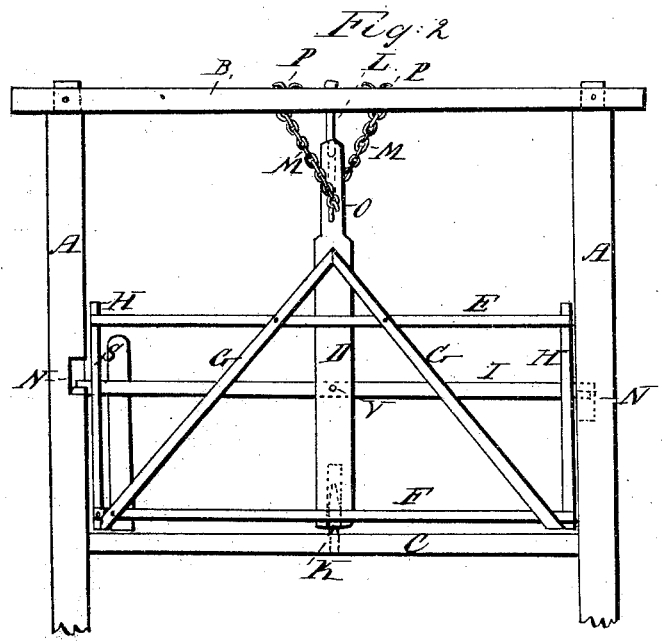
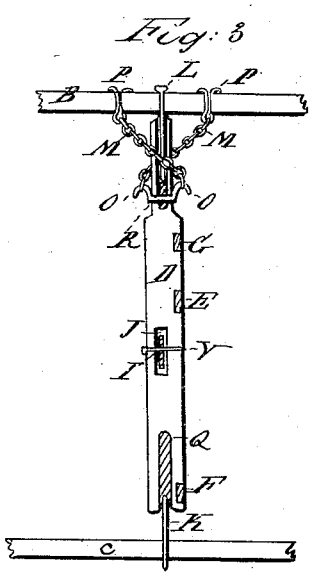
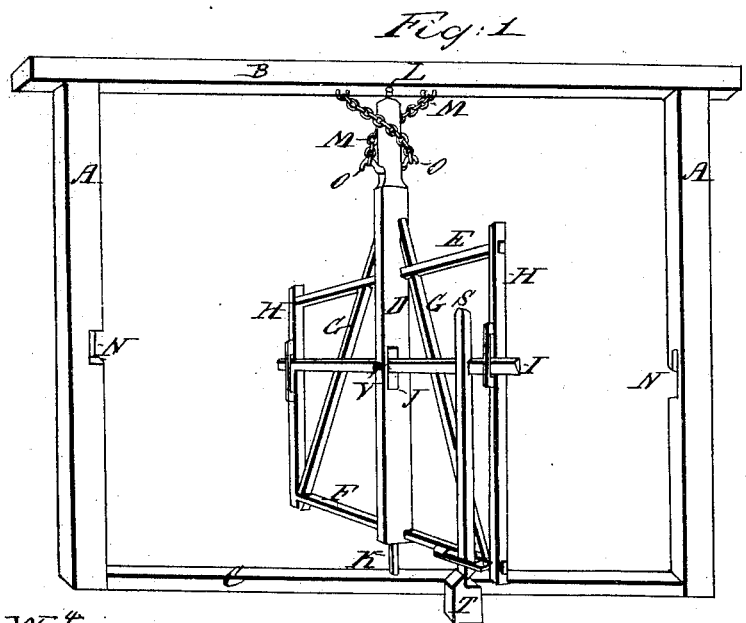
Witnesses.
Saml. L. King
C. Durand
Inventor
J. B. Alexander

United States Patent Office.

JOSEPH B. ALEXANDER, OF WASHINGTON, DISTRICT OF COLUMBIA, ASSIGNOR TO HIMSELF AND JAMES C. DUNCAN, OF OLNEY, ILLINOIS.

Letters Patent No. 65,327, dated June 4, 1867.

GATES.

The Schedule referred to in these Letters Patent and making part of the same.

TO ALL WHOM IT MAY CONCERN:

Be it known that I, JOSEPH B. ALEXANDER, of Washington, in the county of Washington, and in the District of Columbia, have invented certain new and useful improvements in the Mode of Construction and Hanging of Gates; and I do hereby declare that the following is a full, clear, and exact description thereof, reference being had to the accompanying drawings, and to the letters of reference marked thereon, making a part of this specification, in which—

Figure 1 represents in perspective a skeleton view of the gate swung open.

Figure 2 represents a plan view of the gate as shut and latched.

Figure 3 represents a sectional view of the centre-piece of the gate as it would appear when swung open.

Similar letters of reference, where they occur in the several figures, denote like parts in all cases.

The nature of my invention consists in so constructing a gate with a centre-piece at the point of equilibrium as to admit the frame of the gate to be built upon it, and at the same time to act as a fulcrum or centre upon which the gate is turned by means of iron or wooden pins working loosely in each end of said centre-piece. These pins are firmly attached to a cross-plate above, and to a mud-sill beneath, so as merely to steady the gate and keep it in position. The gate is suspended by chains attached by one end to the cross-plate above, and by the other end to hooks on the upper part of the centre-piece. These chains acting by a spiral movement, and causing the gate to rise as it is opened by the effect of the law of gravitation, it will descend and close itself.

To enable others skilled in the art to make and use my invention, I will proceed to describe its construction and operation, reference being had to the accompanying drawings.

I construct a gate by letting into the face of the centre-piece, D, (see fig. 2,) the top rail, E, and the bottom rail, F, the ends of which are let into the upright pieces H H. The braces G G form an angle, the apex of which is let into the piece D, while they are let flush into the rails E and F at the points of contact, thus composing a frame which can never swag. This frame may be covered with palings, with cross-planks, iron rods, or wire, as desired. Into each end of the centre-piece D I make a bore, (see R and Q, fig. 3,) to admit the free play of the pins L and K. Through the slot J, in the piece D, I pass a long latch, I, which is held by the pin V, on which it works loosely. Upon this latch I attach firmly, near one end, the piece S, as a weight to bring down the latch. The lower end of the piece S reaches a little below the bottom of the gate, and is bevelled, so as to act as a catch-bolt into the block T, and thus latch the gate open when swung to that point. I make a gate-frame by planting two posts, A A, perpendicular into the ground. Between them I plant the mud-sill C, into the centre of which I drive the pin K. By tenon and mortise I place on the upper ends of the posts A A the cross-piece or plate B, in the centre of which I place the pin L, and near it, on each side, the staples P P, to which are attached the short chains M M. The posts A A are so mortised at N N as to act as catches for the ends of the latch I, and thus double-latch the gate when closed. I then firmly attach two hooks, O O, to the upper part of the centre-piece D, which is rounded off, and the gate is ready to be hung. I now hang the gate by allowing the pin L to enter the bore R in the centre-piece D. I then push the gate upward until the lower end of the centre-piece D rests on the top of the pin K (see fig. 3.) I then hook the free ends of the chains M M upon the hooks O O, after which I push the centre-piece D so that the bore Q will allow the pin K to slide into it. The gate will then sink down, and the chains being hooked on spirally, will suspend it, and by unwrapping from the centre-piece cause the gate to close and latch itself. This gate can be made wide enough to admit the broadest loaded wagon through either side of the centre. It can never drag the ground or loosen the posts. As there is but little wear, it cannot easily get disordered, and can be instantly taken down or replaced, thus giving a double-width entrance if required.

What I claim as new, and as of my invention, and desire to secure by Letters Patent, is—

A gate so constructed as to be suspended by chains attached to and wrapping spirally on the centre-piece D, causing the gate to close of its own weight, or the same device composed of any other material, substantially as described, and for the purpose set forth.

I also claim the pins L and K, and the bores R and Q, substantially as described, and for the purpose set forth.

In testimony that I claim the foregoing I have hereunto set my hand and seal this 22d day of April, 1867.

J. B. ALEXANDER.

Witnesses:
SAML. L. KING,
C. OURAND.